United States Patent [19]
Grubb et al.

[11] Patent Number: 5,623,508
[45] Date of Patent: Apr. 22, 1997

[54] ARTICLE COMPRISING A COUNTER-PUMPED OPTICAL FIBER RAMAN AMPLIFIER

[75] Inventors: Stephen G. Grubb, Warren; Andrew J. Stentz, Scotch Plains; Kenneth L. Walker, New Providence, all of N.J.

[73] Assignee: Lucent Technologies Inc., Murray Hill, N.J.

[21] Appl. No.: 600,389

[22] Filed: Feb. 12, 1996

[51] Int. Cl.$^6$ .................................................. H01S 3/30
[52] U.S. Cl. ................... 372/3; 372/6; 372/703; 372/69
[58] Field of Search ........................... 372/3, 6, 703, 372/69

[56] References Cited

U.S. PATENT DOCUMENTS

| | | | |
|---|---|---|---|
| 5,323,404 | 6/1994 | Grubb | 372/6 |
| 5,375,010 | 12/1994 | Zervas et al. | 372/6 |
| 5,486,947 | 1/1996 | Ohishi et al. | 372/6 |
| 5,497,385 | 3/1996 | Schmuck | 372/6 |
| 5,497,386 | 3/1996 | Fontana | 372/6 |
| 5,504,771 | 4/1996 | Vahala et al. | 372/6 |
| 5,506,723 | 4/1996 | Junginer | 372/6 |
| 5,544,192 | 8/1996 | Pfeiffer | 372/6 |
| 5,546,414 | 8/1996 | Pfeiffer | 372/6 |

OTHER PUBLICATIONS

"High-gain, Monolithic, Cascaded Fibre Raman Amplifier Operating at 1.3 μm", by S.V. Chernikov et al., *Electronics Letters*, vol. 31, No. 6, 16 Mar. 1995, pp. 472–473.

"Nonlinear Fiber Optics", 2nd Edition, by G.P. Agrawal, Academic Press, pp. 16–19 and 316–335.

"Noise Properties of a Raman Amplifier", by N.A. Olsson et al., *Journal of Lightwave Technology*, vol. LT 4(4), pp. 396–399, Apr. 1986.

"Gain Limit in Erbium–Doped Fiber Amplifiers Due to Internal Rayleigh Backscattering", by S.L. Hansen et al., *IEEE Photonics Technology Letters*, vol. 4, No. 6, Jun. 1992, pp. 559–561.

"EDFA Noise Figure Degradation Caused by Amplified Signal Double Rayleigh Scattering in Erbium Doped Fibres", by F.W. Willems et al., vol. 30, No. 8, 14th Apr. 1994, pp. 645–646.

"Performance Improvement and Optimization of Fiber Amplifier with a Midway Isolator", by S. Yamashita et al., *IEEE Photonics Technology Letters*, vol. 4, No. 11, Nov. 1992, pp. 1276–1278.

"Observation of Equivalent Rayleigh Scattering Mirrors in Lightwave Systems with Optical Amplifiers", by J.L. Gimlett et al., *IEEE Photonics Technology Letters*, vol. 2, No. 3, Mar. 1990, pp. 211–213.

*Primary Examiner*—Leon Scott, Jr.
*Attorney, Agent, or Firm*—Eugen E. Pacher

[57] ABSTRACT

A low noise optical fiber Raman amplifier with integral Raman laser (FRA) is disclosed. The FRA typically comprises a fiber ring with at least two amplifier stages, with strictly counter-propagating pump radiation. Relatively short wavelength (e.g., 1060 nm) pump power is provided to the Raman laser portion of the fiber ring. Appropriately selected and placed Bragg gratings provide one or more optical cavities in the fiber ring, such that the input pump radiation is converted to the desired amplifier pump radiation (e.g., 1240 nm, suitable for amplification of 1310 nm signal radiation). The FRA can, for instance, advantageously serve as power amplifier in digital or analog fiber communication systems, or it can serve as pre-amplifier or in-line amplifier.

10 Claims, 2 Drawing Sheets

WAVELENGTH

ARTICLE COMPRISING A COUNTER-PUMPED OPTICAL FIBER RAMAN AMPLIFIER

RELATED APPLICATION

This application is related to co-assigned U.S. patent application Ser. No. 08/600,354 filed Feb. 12, 1996 of title "Article Comprising a Low Noise Optical Fiber Raman Amplifier", filed concurrently with this by the inventors of the instant application, and incorporated herein by reference.

FIELD OF THE INVENTION

This application pertains to optical fiber Raman amplifiers (FRAs), and to optical fiber communication systems comprising such amplifiers.

BACKGROUND OF THE INVENTION

Erbium-doped optical fiber amplifiers (EDFAs) are well known, and have reached a high level of development. However, these amplifiers are limited to wavelengths of about 1.5 µm. Indeed, at present there are no practical silica-based rare earth doped fiber amplifiers that can be used to provide gain at wavelengths of about 1.3 µm, the operating regime of most currently operating optical fiber communication systems. See, for instance, S. V. Chernikov et al., *Electronics Letters*, Vol. 31 (6), p. 472, (March 1995).

Optical FRAs are known, and can be designed to operate at a desired wavelength at or near 1.3 µm. See, for instance, S. V. Chernikov et al., op. cit. Indeed, Raman amplifiers are potentially promising candidates for such use because they can utilize silica-based fiber, and because of their high transparency when unpumped. For background information on stimulated Raman scattering see, for instance, "Nonlinear Fiber Optics", G. P. Agrawal, 2nd edition, Academic Press 1995, especially pages 16–19, and 316–335, incorporated herein by reference. See also U.S. Pat. No. 5,323,404, also incorporated herein by reference, which inter alia discloses FRAs with a multiplicity of optical "cavities".

Although it is relatively easy to generate large gains (e.g., small signal gain>40 dB) through Raman amplification, prior art high gain FRAs generally are noisy, and we are not aware of any prior art FRAs that have both high net gain and low noise. However, the above referenced concurrently filed application discloses a counter-pumped optical FRA that can provide relatively high gain and relatively low noise. A significant feature of that Raman amplifier is the use of a multiplicity of amplifier stages, with an optical isolator between two adjacent stages. In view of the great potential of FRAs for use in optical fiber systems, e.g., as a replacement for conventional repeaters in 1.3 µm systems, it would be highly desirable to have available such amplifiers capable of providing still higher gain at relatively low noise. This application discloses such amplifiers.

N. A. Olsson et al., *J. Lightwave technology*, Vol. LT 4 (4), p. 396 (April 1986) report measurements of the noise properties of a FRA, with signal-spontaneous emission beating being the dominant noise source. These authors also report (see p. 396, first column, first paragraph of section II) that use of counter-propagating pump radiation greatly reduces high frequency noise due to pump fluctuations.

A great deal of research has been done on the properties of EDFAs. For instance, S. L. Hansen et al., *IEEE Photonics Technology Letters*, Vol. 4 (6), p. 559 (June 1992) consider the limit placed on the maximum gain of EDFAs, and report observation of a significant amount of amplified Rayleigh backscattering (RBS), although the gain was limited by ASE saturation rather than RBS. They also report insertion of an optical isolator (and use of two WDMs to guide the pump radiation around the isolator), with attendant increase in the achievable gain. See, for instance, p. 561, last two paragraphs of "Discussion".

F. W. Willems et al., *Electronics Letters*, Vol. 30 (8), p. 645 (April 1994) measured the noise in EDFAs due to amplified double Rayleigh scattering, and found that attention to this noise source may be advisable for externally modulated analog AM-CATV systems. See, for instance, the "Conclusion" section.

S. Yamashita et al., *IEEE Photonics Technology Letters*, Vol. 4 (11), p. 1276 (November 1992) disclose that the noise and gain characteristics of an EDFA are improved by insertion of a "midway" isolator into the active fiber, with the optimal isolator position being ⅓–½ of the total active fiber length from the input length. See, for instance, p. 1278, last paragraph.

RBS in optical fibers is well known. J. L. Gimlett et al., *IEEE Photonics Technology Letters*, Vol. 2 (3), p. 211 (March 1990) disclose that RBS ". . . can be modeled as a "Rayleigh mirror" which in lightwave systems with optical amplifiers has the same effect as a single discrete reflection with an effective reflectance given by $(R_{bs}/\sqrt{2})$, where $R_{bs}$ is the backscattering reflectance", and that optical isolation may be essential for fiber systems using high-gain optical amplifiers. See, for instance, p. 213, last paragraph. The reported measurements were obtained on a system comprising 30 m of Er-doped fiber between long lengths (120 km and 18 km, respectively) of optical fiber.

SUMMARY OF THE INVENTION

The invention is embodied in an article (e.g., an optical fiber communication system) that comprises a low noise intra-cavity multi-stage FRA with strictly counter-propagating pump radiation.

More specifically, the FRA comprises an input port, an output port, and an optical fiber path that signal-transmissively connects said input and output ports and comprises silica-based amplifier fiber. The FRA further comprises means for introducing a first pump radiation of wavelength $\lambda_p$ less than a signal wavelength $\lambda_s$ into the silica-based amplifier fiber such that the first pump radiation propagates in the amplifier fiber in an upstream direction towards the input port.

Significantly, the silica-based amplifier fiber comprises at least a first length $L_1$ of amplifier fiber and a second length $L_2$ of amplifier fiber, with the first length being upstream of the second length, and with $L_1+L_2$ being at least 200 m. The FRA further comprises an optical isolator disposed between the first and second lengths of amplifier fiber such that passage of at least radiation wavelength $\lambda_s$ from the second to the first length of amplifier fiber is substantially blocked. The FRA still further comprises a pump radiation path that is closed upon itself and includes at least a portion of said silica-based amplifier fiber, said pump radiation path selected such that said first pump radiation can circulate therein. Furthermore, the pump radiation path comprises means for introducing a second pump radiation of wavelength $\lambda_{p'}<\lambda_p$ into the pump radiation path, and still furthermore comprises wavelength-selective first reflective means adapted for substantially blocking passage therethrough of said second pump radiation.

Exemplarily, $\lambda_{p'}$, is 1060 nm, $\lambda_p$ is 1240 nm, $\lambda_s$ is 1310 nm, and the wavelength-selective first reflective means comprise a known high-reflectivity in-line refractive index grating. For the above-specified exemplary wavelengths, the pump radiation path typically will also comprise wavelength-selective reflective means that form optical cavities at, for instance, 1115 and 1175 nm, respectively.

FRAs according to this invention can have advantageous features, including improved efficiency and noise properties, and are expected to find use in many optical fiber communication systems. Among expected applications are use as power amplifier, as pre-amplifier, or as in-line amplifier (e.g., as a replacement for a conventional opto-electronic repeater in a pre-existing 1.3 μm communication system).

DETAILED DESCRIPTION OF AN EXEMPLARY EMBODIMENT

Figure 1:
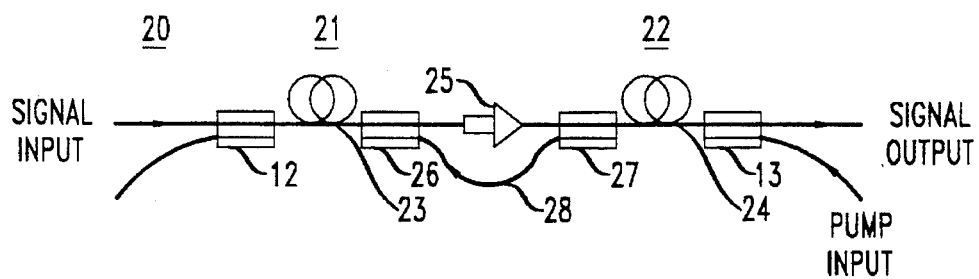
FIG. 1 schematically depicts a two-stage FRA as disclosed in the above-referenced concurrently filed patent application.

FIG. 1 shows a 2-stage FRA (20) as disclosed in the above referenced concurrently filed application, wherein numerals 21 and 22 designate the first and second amplifier stages, respectively. Numerals 23 and 24 refer to first and second amplifier fibers, 25 refers to the inter-stage isolator, 26 and 27 to wavelength selective coupling means (typically fused fiber WDMs), and 28 refers to optical fiber that enables pump radiation to by-pass the isolator. Signal radiation is input through (optional) WDM 12 and output through WDM 13, the latter also serving for coupling pump radiation into the FRA.

Figure 2:
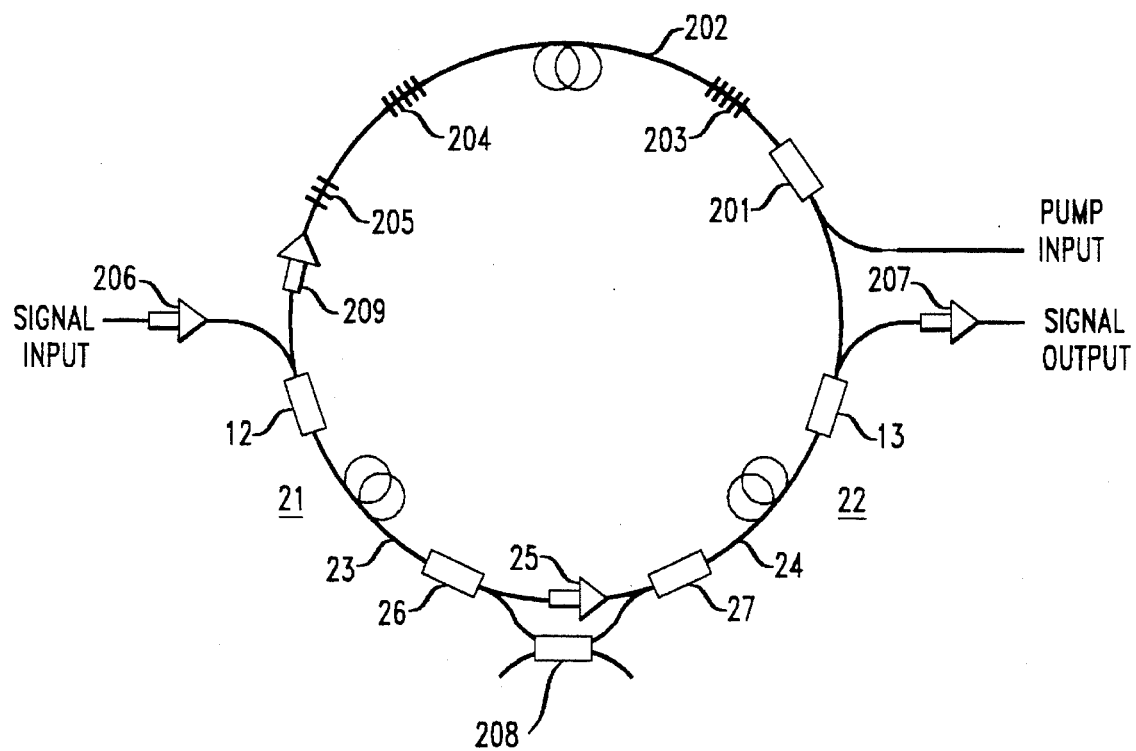
FIG. 2 shows schematically a particular and currently preferred two-stage FRA.

FIG. 2 shows an exemplary FRA according to the invention that can be understood as comprising the 2-stage amplifier of FIG. 1, together with further components that result in a FRA that receives strictly counter-propagating pump radiation from a fiber Raman laser that is integral with the FRA. The combination has circular topology, although a given embodiment of the inventive FRA need not reveal the circular topology upon external inspection.

In FIG. 2, the pump radiation path substantially comprises the circular fiber path, including the by-pass of isolator 25. The 2-stage amplifier portion of the FRA substantially extends from WDM 12 to WDM 13, with fiber 23 located "upstream" of fiber 24. The "upper" portion of the pump radiation path (extending substantially between WDMs 12 and 13 and including fiber 202) comprises a cascaded Raman fiber laser, with the optical cavities defined by appropriately selected wavelength-dependent reflectors schematically shown as gratings 203 and 204. The pump radiation path constitutes a unidirectional ring laser for the first pump radiation (wavelength $\lambda_p$).

More specifically, WDM 201 couples pump radiation (e.g., 1060 nm radiation from a Nd cladding-pumped fiber laser) into the laser ("upper") portion of the combination. The radiation propagates in counterclockwise direction and is reflected by high reflectivity fiber grating 204. The 1060 nm radiation generates in known fashion (see U.S. Pat. No. 5,323,404) radiation of wavelength 1115 nm, which in turn generates radiation of wavelength 1175 nm. It will be understood that fiber grating 204 comprises high reflectivity gratings for radiation of wavelengths 1060 nm, 1115 nm, and 1175 nm, respectively, and grating 203 comprises high reflectivity gratings for radiation of wavelengths 1115 nm and 1175 nm, respectively.

It will be observed that the original pump radiation (1060 nm) as well as the radiation of intermediate wavelengths (1115, 1175) are strictly confined to the "upper" portion of the combination.

The intermediate radiation of wavelength 1175 nm generates, in known manner, radiation of wavelength 1240 nm, which serves as pump radiation for signal radiation of wavelength 1310 nm. The 1240 pump radiation propagates from the "upper" portion of the combination through WDM 13 into the "lower" portion of the combination. It counterpropagates through second amplifier stage 22, is shunted around isolator 25, counterpropagates through first amplifier stage 21, and returns through WDM 12 and isolator 209 to the "upper" portion of the combination.

Isolators 206 and 207 are provided in conventional fashion to prevent amplified noise to be introduced into the input line, and to prevent noise (e.g., Rayleigh scattered radiation) from the output line to reach the amplifier. WDM 208 serves to eliminate noise due to multiple path interference. Numeral 205 designates an (optional) long period fiber grating at about 1240 nm. We have found that provision of such a grating stabilizes the spectrum of the 1240 nm pump radiation, and can prevent spurious lasing. Furthermore, the long period grating can be used to tailor the spectrum of the pump radiation, thereby tailoring the gain spectrum of the FRA. Optical fiber gratings, including high reflectivity gratings and long period gratings, are known. See, for instance, U.S. Pat. Nos. 5,337,382 and 5,309,260. By "long period gratings" we mean gratings having a grating period substantially longer than the wavelength of relevant radiation. Such gratings generally have wavelength-dependent transmission characteristics.

Optical isolator 209 serves to force the 1240 nm ring laser to lase unidirectionally ("clockwise"), and prevents entry of 1.3 μm radiation into the 2-stage Raman amplifier (represented by the "lower" half of the embodiment of FIG. 2).

It will be appreciated that the above recited wavelengths are nominal, and are exemplary only. An amplifier according to the invention can be used to amplify substantially any desired signal wavelength, provided primary pump radiation of an appropriate wavelength and sufficient power is available. Other variations can also be readily made.

For instance, an amplifier analogous to the amplifier of FIG. 2 can be pumped with 1115 nm pump radiation from an Yb cladding pumped laser. Such an arrangement would only require selection of WDM 201 to couple 1115 nm radiation into the ring. Furthermore, filter 203 would be selected for high reflectivity only at 1175 nm, and filter 204 for high reflectivity at 1115 and 1175 nm.

Figure 4:
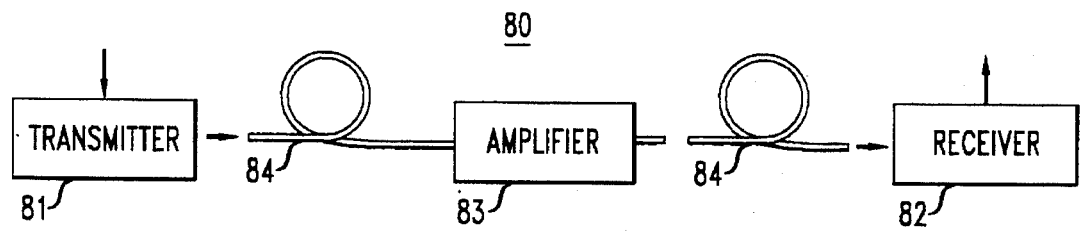
FIGS. 4 and 5 schematically show exemplary optical fiber communication systems comprising a FRA according to this invention.

FIG. 4 schematically depicts an optical fiber communication system 80 according to the invention, wherein numerals 81–84 refer, respectively, to transmitter, receiver, FRA according to the invention, and optical transmission fiber.

Figure 5:
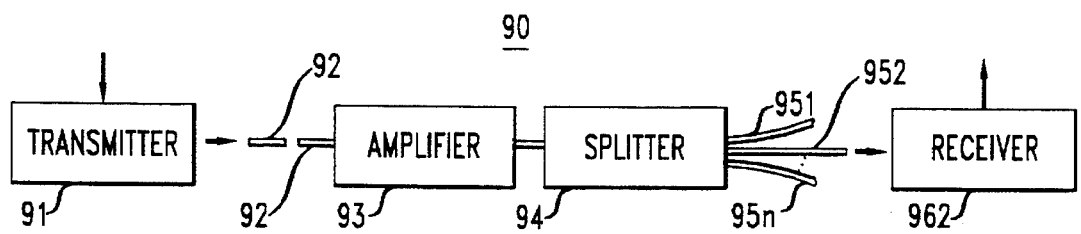

FIG. 5 schematically shows another exemplary embodiment of the invention, namely, a multi-receiver communication system 90, wherein an FRA according to the invention serves as power amplifier that facilitates provision of a signal (exemplarily an analog signal, e.g., a CATV signal) to a multiplicity of receivers (subscribers). Numerals 91–94 refer, respectively, to transmitter, transmission fiber, FRA and splitter. Further amplifiers may be disposed between the transmitter and the FRA but are not known. Spliter 94 divides the amplified signal into n signals that respectively propagate through fibers 951–95n to receivers 961–96n (of which only 962 is shown).

EXAMPLE

Figure 3:
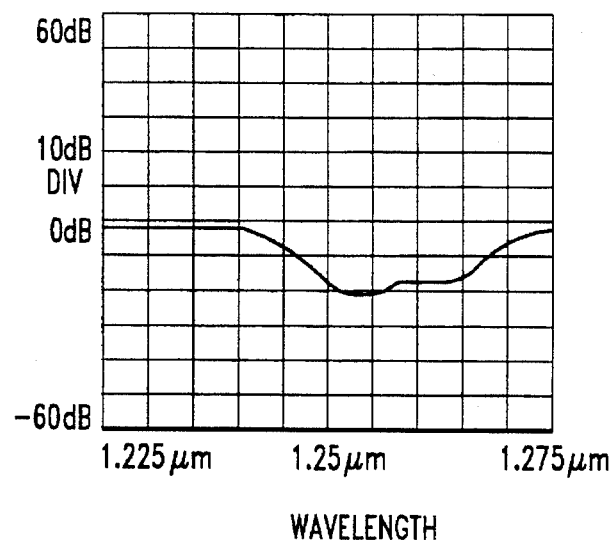
FIG. 3 shows the transmission spectrum of an exemplary long-period in-line fiber grating that is advantageously used in the FRA of FIG. 2.

A FRA as shown in FIG. 2 was assembled and tested. Commercially available components were used for WDMs 12, 26, 27 and 13 and 201, as well as for polarization-insensitive optical isolators 206, 25, 207 and 209. Amplifier fiber 23 was a 2 km length of germanosilicate optical fiber with a depressed cladding, $\Delta=1.0\%$ and an effective core area of 22 $\mu m^2$ at $\lambda=1.3$ μm. Amplifier fiber 24 and laser fiber 202 were 800 m and 1.15 km, respectively, of germanosilicate optical fiber with a depressed cladding, $\Delta=1.6\%$ and an effective core area of 13 $\mu m^2$ at $\lambda=1.3$ μm. Long period grating 205 was written in known manner into the core of a germanosilicate optical fiber by UV exposure, and had the transmission spectrum shown in FIG. 3. "Grating" 204 consisted of three short-period Bragg gratings written in known manner into the core of a germanosilicate optical fiber by UV exposure. Each grating was a high reflector, with bandwidth of about 2 nm. The center wavelengths of the gratings were 1060 nm, 1115 nm and 1175 nm, respectively. Grating 203 consisted of two short-period Bragg gratings as described immediately above, with center wavelengths of 1115 nm and 1175 nm, respectively. The FRA was pumped with 1060 nm radiation from a cladding pumped Nd fiber laser.

The FRA was tested as a power digital amplifier. A frequency dithered electro-absorption modulated laser at 1310 nm was used as the signal source. The signal was amplified with the FRA, propagated through a section of AT&T 5D fiber and then was detected by a conventional bit-error-rate test set. With the Raman amplifier generating a net gain of 19 dB and an output power of 21 dBm, a 10 Gbit/sec NRZ signal was propagated through 102 km of 5D fiber without introducing a power penalty. A 5 Gbit/sec signal was amplified to a launch power of 25 dBm and propagated through 120 km of 5D fiber while introducing only 1 dB of power penalty.

The FRA was also preliminarily tested as a power analog amplifier. An analog grade 1310 nm laser diode modulated with 77 CATV channels was used as the signal source. The FRA generated over 20 dBm of output power while maintaining a carrier-to-noise ratio (CNR) of 48 dB and a composite second order and composite triple beat both less than the required −60 dBc. It is expected that minor modifications will yield CNR>50 dB.

The invention claimed is:

1. An article comprising an optical fiber Raman amplifier comprising
   a) an input port;
   b) an output port;
   c) an optical fiber path that signal-transmissively connects said input and output ports, said optical fiber path comprising silica-based amplifier fiber; and
   d) means for introducing a first pump radiation of wavelength $\lambda_p$ less than a signal wavelength $\lambda_s$ into said silica-based amplifier fiber such that the first pump radiation propagates in said silica-based amplifier fiber in an upstream direction towards said input port; characterized in that
   e) said silica-based amplifier fiber comprises at least a first length $L_1$ of amplifier fiber and a second length $L_2$ of amplifier fiber, with the first length being upstream of the second length, and $L_1+L_2$ being at least 200 m;
   f) the optical fiber Raman amplifier comprises an optical isolator disposed between said first and second lengths of amplifier fiber such that passage of at least radiation of wavelength $\lambda_s$ from the second to the first length of amplifier fiber is substantially blocked;
   g) the optical fiber Raman amplifier further comprises a pump radiation path that is closed upon itself and includes at least a portion of said silica-based amplifier fiber, said pump radiation path selected such that said first pump radiation can circulate therein; and
   h) the pump radiation path comprises means for introducing a second pump radiation of wavelength $\lambda_{p'}<\lambda_p$ into the pump radiation path, and furthermore comprises wavelength-selective first reflective means adapted for substantially blocking passage of said second pump radiation through said first reflective means.

2. Article according to claim 1, wherein $\lambda_s$ is approximately 1310 nm, $\lambda_p$ is approximately 1240 nm and $\lambda_{p'}$ is approximately 1060 nm.

3. Article according to claim 2, wherein said pump radiation path comprises two spaced apart fiber gratings having a high reflectivity at a wavelength between $\lambda_{p'}$ and $\lambda_p$, said two fiber gratings defining an optical cavity for radiation of the wavelength between $\lambda_{p'}$ and $\lambda_p$.

4. Article according to claim 3, wherein said optical cavity has a length of at least 100 m.

5. Article according to claim 1, wherein said wavelength-selective first reflective means comprise a fiber grating having a high reflectivity at wavelength $\lambda_{p'}$, such that substantially all radiation of wavelength $\lambda_{p'}$ that is introduced into the pump radiation path at a pump input port is reflected back towards the pump input port.

6. Article according to claim 1, wherein $\lambda_s$ is approximately 1310 nm, $\lambda_p$ is approximately 1240 nm, and $\lambda_{p'}$ is approximately 1115 nm.

7. Article according to claim 1, wherein the article is an optical fiber communication system comprising a transmitter, a receiver spaced apart from the transmitter, and an optical fiber transmission path signal transmissively connecting the transmitter and receiver, wherein said optical fiber transmission path comprises said optical fiber Raman amplifier.

8. Article according to claim 7, wherein the optical fiber communication system is an analog communication system, with the transmitter comprising means for modulating a signal radiation source with a multiplicity of analog signals.

9. Article according to claim 1, further comprising means for tailoring a gain spectrum of the optical Raman amplifier.

10. Article according to claim 9, wherein said means for tailoring the gain spectrum comprise a filter with wavelength-dependent transmission characteristics.

* * * * *